United States Patent [19]
Matthews et al.

[11] 4,050,665
[45] Sept. 27, 1977

[54] VIBRATION DAMPING APPARATUS

[75] Inventors: John W. Matthews, Fountain Valley; Harry Dennis Sigel, Santa Ana; Peter Hauk, Huntington Beach, all of Calif.

[73] Assignee: Newport Research Corporation, Fountain Valley, Calif.

[21] Appl. No.: 657,337

[22] Filed: Feb. 11, 1976

[51] Int. Cl.² .................... F16F 7/10; B23B 29/02
[52] U.S. Cl. .................... 248/358 R; 248/22
[58] Field of Search .................... 248/18, 22, 358 R; 188/1 B

[56] References Cited

U.S. PATENT DOCUMENTS

| | | | |
|---|---|---|---|
| 2,960,189 | 11/1960 | Osburn | 188/1 B |
| 3,075,406 | 1/1963 | Butler et al. | 188/1 B UX |
| 3,107,752 | 10/1963 | McLean | 188/1 B X |
| 3,373,633 | 3/1968 | Desmond et al. | 188/1 B UX |
| 3,486,585 | 12/1969 | Richter et al. | 188/1 B |
| 3,552,230 | 1/1971 | McLean | 188/1 B X |
| 3,559,512 | 2/1971 | Aggarwal | 188/1 B UX |
| 3,690,414 | 9/1972 | Aggarwal | 188/1 B |
| 3,774,730 | 11/1973 | Maddux | 188/1 B |

Primary Examiner—J. Franklin Foss
Attorney, Agent, or Firm—Benoit Law Corporation

[57] ABSTRACT

Apparatus for securing vibration sensitive equipment relative to a support comprising a rigid structure having an outer surface for attachment of the vibration sensitive equipment, a hollow interior and a wall portion between the outer surface and the hollow interior. This structure is rigidly attachable to the support. The hollow interior contains at least two dynamic damping systems having different resonance characteristics. Each dynamic damping system comprises a damping mass elastically mounted in spaced relationship to the wall portion.

31 Claims, 7 Drawing Figures

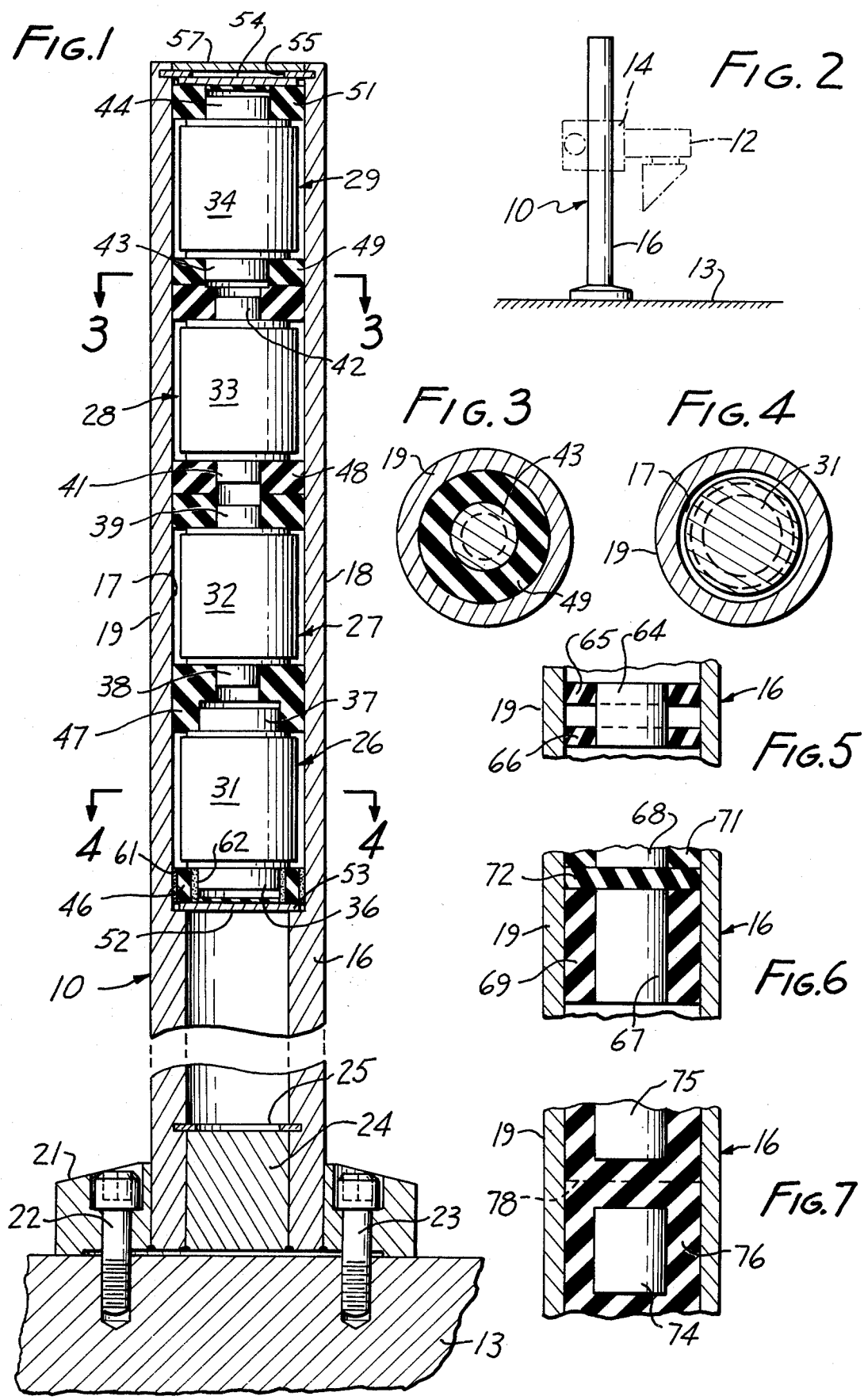

VIBRATION DAMPING APPARATUS

BACKGROUND OF THE INVENTION

1. Field of the Invention

The subject invention relates to vibration damping apparatus and, more specifically, to apparatus including dynamic damping systems and apparatus for damping vibrations in vibration sensitive equipment, as well as apparatus for securing vibration sensitive equipment relative to a support.

2. Description of the Prior Art

For a number of years, rods or posts have been employed to position components in optical systems. These rods are typically rigidly affixed to a bench, table or other common support, while the components, such as lenses, prisms, mirrors, or other apparatus mounted in holding devices, are secured to the rod via collars or sleeves incorporated in the component assembly. These are convenient arrangements since they enable continuous positioning of the component along the length and possibly around the axis of the rod and consequently the adjustment of the relative positions of optical components in a system. By suitable design of the interface between the component assembly and the rod, and by the use of locking screws, collar clamps or other fastening devices, any looseness between the rod and component assembly can be eliminated and the rod and component assembly behave as a single rigid body affixed to the common support.

It is most desirable and in some cases mandatory that relative motions between several different rod-mounted components be held to very small values, indeed to less than $10^{-6}$ inches, in order to apply certain optical techniques such as holography or interferometry. For such small values of relative motion, the response of the rods to ambient vibrations and airborne disturbances becomes a major concern and it is necessary to employ rods of appreciable cross section and great inherent static rigidity. However, when such rods are constructed of metal or other materials possessing the large elastic modulus necessary to provide this great inherent static rigidity in a reasonable volume, a serious problem reamins. Such materials characteristically lack sufficient inherent structural damping to avoid large resonant motions of the rod assembly when the frequency of any ambient excitation corresponds with one of the structural resonances of the rod assembly. When this occurs, the rod assembly exhibits large motions in response to quite small excitation levels and may consequently prevent successful operation of the optical system. Therefore, it is most desirable to provide some additional means of damping rod structures for such applications, which means should ideally emulate intrinsic structural damping.

Most prior art devices of any relevance are of the shock mount or vibration isolation type, as may be seen from U.S. Pat. Nos. 2,642,252, 2,819,060, 2,948,126, 3,128,978, 3,181,850, 3,305,227, 3,430,902 and 3,764,100. Devices of this kind would be unsuitable for present purposes, since they trap support-coupled vibrational energy in the support structure and possess inadequate static rigidity. The remaining prior-art damping devices may be identified in terms of four distinct types of damping structures, treated in the extensive engineering literature on the subject (see G. H. Bruns and A. D. Nashif, "Experimental Verification of Theory of Damping of a Simple Structure by Distributed Tuned Dampers," Air Force Materials Laboratory, Wright-Patterson Air Force Base Report No. AFML-TR-65-440 [Jan. 1966]; J.C. Snowdon, "Vibration and Shock in Damped Mechanical Systems,"[Wiley, New York, 1968] Ch. 10; Harris and Crede, "Shock and Vibration Handbook" [McGraw Hill, New York, 1961] Col. 1, Ch. 6).

One of these four types may be termed constrained layer damping and comprises an arrangement in which a relatively thin layer of lossy viscoelastic material is confined or bonded between two layers of structural material, either or both of which may be rigidly attached to the main structure in such a way that flexure of the structure during vibration is coupled to one or both of the structural members and results in energy dissipating cyclic shear stresses in the viscoelastic layer. While simple in concept and intrinsically broadband, this method does not lend itself to ready incorporation in a rodlike structure, nor, more significantly, does it provide the large requisite damping. The proposal of U.S. Pat. No. 3,314,502, by R. P. Thorn, issued Apr. 18, 1967, falls into this class.

Another of the four types, the undamped dynamic absorber, consists of an undamped auxiliary mass, spring coupled to the principal structure, and tuned to the typically constant frequency of excitation of the principal structure so that at this frequency the absorber enforces a motional node at its point of attachment. This arrangement has a very narrow effective bandwidth and requires either a relatively large absorber mass or excessively large absorber motional amplitudes. It is typically employed with rotating machinery. The basic proposal contained in U.S. Pat. No. 2,268,495, by O. S. Petty, may be considered in this context.

A third type, the untuned viscous damper, consists of an auxiliary mass statically uncoupled from the main structure (i.e., not tending to recover from slow displacement relative to the main structure) and yet having viscous damping of motions relative to the main structure. This arrangement has the same broadband, moderate damping characteristics as the constrained layer arrangement and moreover is ineffective for small motional amplitudes. The proposal of British Patent Specification 829,562 falls into this category.

The fourth type, known as tuned, viscously damped dyanamic absorber, consists of an auxiliary mass, sometimes called seismic mass, spring coupled to the principal structure and possessing damping in its motion relative to the principal structure. This arrangement has an effective frequency bandwidth which is relatively narrow and directly related to the degree of damping and motional amplitude of the auxiliary or seismic mass.

SUMMARY OF THE INVENTION

It is broadly an object of this invention to overcome the above mentioned disadvantages.

It is a related object of the invention to provide improved vibration damping techniques and equipment.

It is also an object of this invention to provide improved apparatus for securing vibration sensitive equipment relative to a support.

It is a further object of this invention to provide damping systems or assemblies of increased bandwidth and degree of damping.

The subject invention resides in apparatus for securing vibration sensitive equipment relative to a support, comprising in combination a rigid structure having an outer surface for attachment of the vibration sensitive equipment, a hollow interior and a wall portion between the outer surface and the hollow interior, means attached to the structure for rigidly attaching the structure to the support, and at least two dynamic damping systems in the hollow interior having different resonance characteristics, one of the dynamic damping systems comprising a first damping mass smaller than the hollow interior and first elastic mounting means for mounting the first damping mass in the hollow interior in spaced relationship to the wall portion, and the other of the dynamic damping systems comprising a second damping mass smaller than the hollow interior and second elastic mounting means for mounting the second damping mass in the hollow interior in spaced relationship to the wall portion.

In accordance with a preferred embodiment of the subject invention, the latter first and second elastic mounting means are integral.

From another aspect thereof, the subject invention resides in apparatus for securing vibration sensitive equipment relative to a support, comprising in combination a rigid structure having an outer surface for attachment of the vibration sensitive equipment, a hollow interior and a wall portion between the outer surface and the hollow interior, means attached to the structure for rigidly attaching the structure to the support, and a plurality of viscoelastically damped dynamic absorbers having different resonance characteristics, each of the dynamic absorbers comprising an individual damping mass and individual mounting means for mounting the corresponding damping mass in the hollow interior in spaced relationship to the wall portion, and each of the mounting means for each of the mounting masses including a viscoelastic damper member encompassing at least a portion of the corresponding damping mass and extending from that damping mass portion to the wall portion of the rigid structure.

From another aspect thereof, the subject invention resides in apparatus for securing vibration sensitive equipment relative to a support, comprising in combination a rigid structure having an outer surface for attachment of the vibration sensitive equipment, a hollow interior and a wall portion between the outer surface and the hollow interior, means attached to the structure for rigidly attaching the structure to the support, and at least two dynamic damping systems in the hollow interior having different resonance characteristics, one of the dynamic damping systems comprising a first damping mass smaller than the hollow interior and first elastic mounting means for mounting the first damping mass in the hollow interior in spaced relationship to the wall portion, the first elastic mounting means including a first viscoelastic damper member encompassing a first end portion of the first damping mass and extending from the first end portion to the wall portion of the rigid structure, and a second viscoelastic damper member encompassing an opposite second end portion of the first damping mass an extending from the second end portion to the wall portion of the rigid structure, and the other of the dynamic damping systems comprising a second damping mass smaller than the hollow interior and second elastic mounting means for mounting the second damping mass in the hollow interior in spaced relationship to the wall portion, the second elastic mounting means including a third viscoelastic damper member encompassing a first end portion of the second damping mass and extending from the first end portion of the second damping mass to the wall portion of the rigid structure, and a fourth viscoelastic damper member encompassing an opposite second end portion of the second damping mass and extending from the second end portion of the second damping mass to the wall portion of the rigid structure.

From another aspect thereof, the subject invention resides in apparatus for securing vibration sensitive equipment relative to a support, comprising in combination a rigid structure having an outer surface for attachment of the vibration sensitive equipment, a hollow interior and a wall portion between the outer surface and the hollow interior, means attached to the structure for rigidly attaching the structure to the support, and at least two dynamic damping systems in the hollow interior having different resonance characteristics, one of the dynamic damping systems comprising a first damping mass smaller than the hollow interior and first elastic mounting means for mounting the first damping mass in the hollow interior in spaced relationship to the wall portion, the first damping mass having opposite first and second mounting pins, and the first elastic mounting means including a first viscoelastic damper member encompassing the first mounting pin and extending from the first mounting pin to said wall portion of the rigid structure, and a second viscoelastic damper member encompassing the second mounting pin and extending from the second mounting pin to the wall portion of the rigid structure, and the other of the dynamic damping systems comprising a second damping mass smaller than the hollow interior and second elastic mounting means for mounting the second damping mass in the hollow interior in spaced relationship to the wall portion, the second damping mass having opposite third and fourth mounting pins, and said second elastic mounting means including a third viscoelastic damper member encompassing the third mounting pin and extending from the third mounting pin to the wall portion of the rigid structure, and a fourth viscoelastic damper member encompassing the fourth mounting pin and extending from the fourth mounting pin to the wall portion of the rigid structure, with the thickness of at least one of the third and fourth viscoelastic damper members between the wall portion and the corresponding mounting pin being different from the thickness of at least one of the first and second viscoelastic damper members between the wall portion and the corresponding mounting pin.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is an elevation, in section, of a mounting rod in accordance with a preferred embodiment of the subject invention;

FIG. 2 is a side view, on a smaller scale, of the mounting rod of FIG. 1 and its relation to associated equipment;

FIG. 3 is a section taken along the line 3 — 3 in FIG. 1;

FIG. 4 is a section taken along the line 4 — 4 of FIG. 1; and

FIG. 6 to 7 are fractional elevations in section, of modifications of the structure shown in FIG. 1, in accordance with further embodiments of the subject invention.

DESCRIPTION OF PREFERRED EMBODIMENTS

The mounting rod 10 shown in FIGS. 1 to 4, and the modifications thereof illustrated by FIGS. 5 to 6, incorporate effective auxiliary mass damping in apparatus or devices for securing vibration sensitive equipment 12 relative to a support 13. As indicated in FIG. 2, the vibration sensitive equipment may comprise an optical component assembly which is releasably clamped to the mounting rod at 14. It is, of course, understood that the variety of devices which can be mounted or damped by the structures of the subject invention, as well as the utility and fields of applicability of the disclosed mounting or damping structure and their underlying inventive principles, are indeed vast.

The support 13 on which the damping structure 10 operates is typically a bench, table or other common support which is of itself damped or vibration insensitive. By way of preferred example, the support 13 is of a rigidity equal or comparable to that of the rigid or stiff part of the mounting rod 10.

Since the resonant frequency spectrum of the rod 10 and the component assembly 12 depends on both the mass and position of the component mounted on the rod, and to some extent on the geometry of the component itself, it is necessary to provide effective damping for a broad range of frequencies and mass loading of the support member. In the illustrated preferred embodiment, this is being accomplished by the technique of using multiple (four are presently preferred) optimal viscoelastically damped dynamic absorbers tuned to a preferred pattern of frequencies. The frequency region for which the damping system is most effective corresponds to the region of the large amplitude fundamental transverse flexural resonances of various typical rod/-component configurations. Moreover, these dampers may be arranged within the rod member 10 in a way that neither compromises the static rigidity of the support member nor encumbers its exterior.

To afford a more particular reference to the principles of the subject invention and to exemplify further considerations, a preferred embodiment of the invention treating transverse flexural vibrations in a cylindrical support or mounting member will now be described.

The mounting rod 10 includes a rigid structure 16 which, in the illustrated preferred embodiment, has a hollow-cylindrical configuration. Accordingly, the rigid structure 16 has a hollow interior 17. In addition, the rigid structure 16 has an outer surface 18 for the attachment of the vibration sensitive equipment or component assembly 12. The rigid structure 16, moreover, has a wall portion 19 between the outer surface 18 and the hollow interior 17.

The rigid structure 16 with its wall portion 19 is made of steel or another metal or material possessing the large elastic modulus necessary to provide the great inherent static rigidity in a reasonably practical volume requisite for the particular mounting purpose.

A collar or annulus 21 and a number of screws, two of which are shown at 22 and 23, cooperate in rigidly attaching the structure 16 to the support 13. The collar 21 is preferably welded or otherwise rigidly attached to the structure 16. It is important that no elastic devices or members be interposed between the mounting surface 18 on the one hand and the stable support 13 on the other hand. A plug 24, which may also be of metal and welded to the structure 16, closes the lower end of the hollow interior of the mounting rod and is positioned by an annular positioning device 25.

Four dynamic damping systems 26 to 29, having different resonance characteristics, are disposed in the hollow interior 17. Each of these dynamic damping systems 26, 27, 28, and 29 has a damping mass 31, 32, 33, and 34, respectively, which is smaller than the hollow interior 17. There is thus always a space between any portion of each damping mass and the adjacent wall portion 19 of the rigid mounting structure.

Each of the dynamic damping systems 26 to 29 also includes elastic mounting devices for mounting its damping mass in the hollow interior 17 in spaced relationship to the wall portion 19.

In the preferred embodiments illustrated in FIGS. 1 to 7, the mounting devices include elastic members encompassing at least a portion of the particular damping mass and extending from that damping mass portion to the wall portion 19, as will presently be described.

In the specific preferred embodiment shown in FIGS. 1 to 4, the damping masses or weights 31 to 34 are cylindrical like the structure or rod 16 and the interior or cavity 17. Also, while the different damping masses could be located in different hollow interiors or cavities, the masses 31 to 34 in the illustrated preferred embodiment are located in the one hollow interior or cavity 17.

Each mass 31, 32, 33 and 34 has a pair of mounting members, pins or hubs 36 and 37, 38 and 39, 41 and 42, and 43 and 44, respectively, which project from opposite ends of the particular mass and, in the illustrated preferred embodiment, are concentric with the longitudinal axis through that mass. In the embodiment shown in FIGS. 1 to 4, the cylindrical mounting members 36 to 39 and 41 to 44 are the portions of the masses that are encompassed by the elastic mounting members.

In particular, the mounting member 36 is encompassed by a viscoelastomeric washer 46, the mounting members 37 and 38 by a shouldered viscoelastomeric washer 47, the mounting members 39 and 41 by a compound viscoelastomeric washer 48, the mounting members 42 and 43 by a further compound viscoelastomeric washer 49 and the mounting member 44 by a terminal viscoelastomeric washer 51.

A disk 52 rests on a shoulder 53 in the rigid structure or hollow rod 16 and supports the stack of parts contained in the hollow interior 17. That stack of parts is further confined by a disk 54 which is held in place by a snap ring 55 engaged in an annular groove in the rod 16 and covered by a dress cap 57.

The tuned frequency and damping characteristics of each damping system depend on the mass of the damper weight, the elastic and damping constants of the viscoelastic washer material, the location of the damper weight in the principal support member structure, the detailed geometry of the several parts, and to a lesser degree on the location and characteristics of the other dampers. It is observed that when an auxiliary or seismic damper mass is connected through a viscoelastic link to a simply vibrating structure, the system will exhibit a pair of damper resonances, the frequencies of which straddle the tuned frequency of the damper. Such an absorber is said to be optimally tuned and damped when the magnitude of these resonances, as measured in particular by the transmissibility (damper displacement to structure displacement ratio), are equal and thus maximum. Any other adjustment of the tuning or damping will diminish the relative motion of the damper mass and structure at one of the resonances and thereby decrease the rate at which motional energy of the vibrating structure is absorbed.

In the illustrated preferred embodiments, the square of the tuned frequency of each damping system or absorber varies substantially directly with the elastic modulus and effective transmission area of the viscoelastic washer and inversely with the damper mass and the effective transmission thickness of the viscoelastic washer. The effectiveness of the damping system or absorber varies directly with the damper mass and inversely with its distance from the motional antinode of the fundamental vibration of the structure or rod 16. The damping is an intrinsic property of the viscoelastic washer and is thereby a function of its particular chemical constitution and method of compounding. The mass and location of any particular device mounted on the support member may vary the fundamental flexural resonant frequency over a range of more than two octaves in typical configurations.

In principle, the requisite different resonance characteristics of the several dynamic damping systems in the rod 16 could be realized with the aid of different damping masses. However, the illustrated damping masses 31 to 34 are of the same order of magnitude and computer structural analysis and engineering studies have confirmed this as the presently preferred embodiment of the subject invention.

Also in accordance with the illustrated preferred embodiment of the invention, the different resonance characteristics of the dynamic damping systems are realized by differences in the washers 46 to 49 and 51.

In particular, the mass mounting members 36 to 39 and 41 to 44 are provided with different diameters such as shown in FIG. 1. The diameter of a mounting member 36, etc. determines the diameter of the aperture of the corresponding elastic washer 46, etc. This, in turn, determines the thickness of the washer between the mounting member and the wall portion 19. In FIG. 1, this thickness is smaller for the washer 46 than for the washer 48, for instance. The washer 46 thus presents a stiffer spring than the washer 48, at least if both of these washers were made of the same elastomeric material. As a result, the damping system including the washer 46 would have a higher resonant frequency than the damping system including the washer 48.

The elastic mounting means, members or washers may thus be provided with different dimensions for the realization of different tuned frequencies of the various damping systems.

In accordance with further preferred embodiments, the elastic mounting means, members or washers are provided with different damping characteristics and/or different moduli of elasticity. While a variety of natural and synthetic viscoelastomeric materials alone or in combination with other materials would be appropriate for the fabrication of the elastic links required in any particular design, convenient materials include polyurethane and silicone rubbers, the latter of these two providing especially convenient formulation adjustment of damping characteristics as well as attractive environmental stability.

By way of example and not by way of limitation, the materials employed for making the washers 46, etc. may include room temperature vulcanizing silicone compounds of the type sold by General Electric Company under the designation RTV 511 (a methyl-phenyl silicone rubber), RTV 602 (a dimethyl silicone rubber), and 10,000 poise Viscasil (a silicone oil), and SRC-05 catalyst. The several washers depicted in FIG. 1 were formulated as follows: washer 51 and the upper part of compound washer 49 with 74% by weight RTV 602 and 26% Viscasil, the lower half of compound washer 49 and the upper half of compound washer 48 with 62% RTV 602 and 38% Viscasil; the lower half of washer 48, the washer 47 and the washer 46 with 61% RTV 511, 13% RTV 602 and 26% Viscasil; all formulations employing 0.3 to 0.4% catalyst.

As apparent from the latter example, the entire washer 47 is of the same viscoelastic material throughout. Different resonance characteristics for the systems including the masses 31 and 32 are, however, still realized by a stepped or shouldered design of the washer 47 accommodating the different diameter mounting members 37 and 38.

As is further apparent from the latter example, the stepped configuration technique of the washer 47 may be combined with a different composition technique as in the case of the washer 49 where the upper and lower halves are differently formulated.

Alternatively, and as shown with the aid of washer 48, the different formulation technique for different washer parts may also be employed when the diameters of the mass mounting members 39 and 41 are equal.

It will thus be realized that differently dimensioned and/or formulated elastic mounting members may be integral as shown at 48 and 49 of FIG. 1.

In accordance with a further preferred embodiment of the subject invention, the elastic washer may be bonded to either or both the damping mass and the wall portion 19. For instance, FIG. 1 shows an adhesive layer 61 which bonds the elastic washer 46 to the wall portion 19 of the rod 16 and an adhesive layer 62 which bonds the washer 46 to the mounting member 36 of the mass 31. Other washers, such as the washer 51, on the other hand, are movable relative to the wall portion 19 and the mass mounting member 44 in the sense of not being bonded to either. In practice, frequency tuning or variation of resonance characteristics may be realized by such selective bonding and non-bonding of elastic mounting means to adjacent structural members.

In particular, a bonded washer, such as the washer 46 in FIG. 1 is not only subjected to compression in the direction of movement of a vibrational load, but also to tension and shear stresses. For instance, if a vibrational motion of the damper weight 31 at a given instance is considered in terms of a force vector, extending diametrically through the washer 46, then it will be realized that compression occurs adjacent the head section of the vector, while tension occurs adjacent the tail end of the vector and shearing takes place laterally of the force vector.

On the other hand, only compression takes place and the tension and shearing effects are lacking if the washer is not bonded to adjacent structural parts and is thus movable relative to the wall portion 19 and mass mounting member 36.

As shown in FIG. 5, the damping masses need not have laterally projecting mounting members. Rather, a continuously cylindrical mounting mass 64 may directly be provided with viscoelastic support washers 65 and 66. Preferably, these would be bonded to the mass 64 and rod wall portion 19.

According to FIG. 6, damping masses 67 and 68 are provided with individual sleeves 69 and 71, respectively, of viscoelastic material. These may be bonded to the wall portion 19 and masses 67 and 68 or may just fill the space therebetween without being bonded thereto. In the latter case, it is advisable to provide an elastic disk 72 between the damping systems or an elastic spacer washer between the sleeves 69 and 71. Either disk 72 or said spacer washer may be of an inelastic material such as metal.

According to FIG. 7, damper masses 74 and 75 are combined with a mass of viscoelastic material 76 which fills the spaces between the masses and between the masses and the wall portion 19 of the rod 16. The mass of viscoelastic material may either be integral for two or more damper masses or, as indicated by the dotted line 78 in FIG. 7, may be individually allocated to each damping mass by virtue of fabrication or composition.

A damping mass with individually allocated viscoelastic enveloping mass 76 may then be viewed as a damping module. Modules with different resonant characteristics may then be realized by different formulation and/or dimensioning of the enveloping elastic mass or damper weight.

The performance of the illustrated four damper configuration installed in a support cylinder of standard exterior dimensions is much superior to either a solid or tubular rod of similar dimensions. Motional amplitudes at resonances (particularly the fundamental resonance) are reduced by a factor of 5 to 20. Using such "damped rods" it is now possible to employ conventional rod mounted optical systems in much noisier environments than otherwise possible and to conduct more demanding experiments and procedures in conventional environments. The former consideration opens the door for the application of such advanced optical techniques as those of holographic interferometry to the solution of practical non-destructive testing problems in industrial environments while the latter consideration may significantly enhance the feasibility of routine treatment of difficult research problems.

While the rod 16 has been shown vertically, it should be understood that it may be employed in a horizontal or in any other desired position.

Also, while the foregoing disclosure emphasizes cylindrical structures subject to transverse flexural motions relative to the lower extremity of the structure and radially symmetric tuned, viscoelastically damped dynamic absorbers appropriate thereto, it is apparent that the novel essence of the subject invention would equally apply to circumstances with uniaxial, biaxial, spherical or other symmetries or to such cases in which a multiplicity of dampers served to absorb structure motional energies related to more than one vibrational mode.

The subject extensive disclosure will suggest or render apparent to those skilled in the art various modifications and variations within the spirit and scope of the subject invention.

We claim:

1. Apparatus for securing vibration sensitive equipment relative to a support, comprising in combination:
    a rigid structure comprising a rigid mounting rod having an outer surface for attachment of said vibration sensitive equipment, a hollow interior and a wall portion between said outer surface and said hollow interior;
    means for rigidly attaching said mounting rod to said support; and
    at least two dynamic damping systems in said hollow interior having different resonance characteristics;
    one of said dynamic damping systems comprising a first damping mass smaller than said hollow interior and first elastic mounting means for mounting said first damping mass in said hollow interior in spaced relationship to said wall portion; and
    the other of said dynamic damping systems comprising a second damping mass smaller than said hollow interior and second elastic mounting means for mounting said second damping mass in said hollow interior in spaced relationship to said wall portion.

2. Apparatus as claimed in claim 1, wherein:
    said first and second elastic mounting means have different damping characteristics.

3. Apparatus as claimed in claim 1, wherein:
    said first and second elastic mounting means have different dimensions.

4. Apparatus as claimed in claim 1, wherein:
    said first and second elastic mounting means have different moduli of elasticity.

5. Apparatus as claimed in claim 1, wherein:
    said first and second damping masses are of the same order of magnitude.

6. Apparatus as claimed in claim 1, wherein:
    at least said first damping mass is bonded to said first elastic mounting means.

7. Apparatus as claimed in claim 1, wherein:
    said first and second elastic mounting means are movable relative to said wall portion.

8. Apparatus for securing vibration sensitive equipment relative to a support, comprising in combination:
    a rigid structure having an outer surface for attachment of said vibration sensitive equipment, a hollow interior and a wall portion between said outer surface and said hollow interior;
    means attached to said structure for rigidly attaching said structure to said support; and
    at least two dynamic damping systems in said hollow interior having different resonance characteristics;
    one of said dynamic damping systems comprising a first damping mass smaller than said hollow interior and first elastic mounting means for mounting said first damping mass in said hollow interior in spaced relationship to said wall portion; and
    the other of said dynamic damping systems comprising a second damping mass smaller than said hollow interior and second elastic mounting means for mounting said second damping mass in said hollow interior in spaced relationship to said wall portion at least said first elastic mounting means being bonded to said wall portion.

9. Apparatus for securing vibration sensitive equipment relative to a support, comprising in combination:
    a rigid structure having an outer surface for attachment of said vibration sensitive equipment, a hollow interior and a wall portion between said outer surface and said hollow interior;
    means attached to said structure for rigidly attaching said structure to said support; and
    at least two dynamic damping systems in said hollow interior having different resonance characteristics;
    one of said dynamic damping systems comprising a first damping mass smaller than said hollow interior and first elastic mounting means for mounting said first damping mass in said hollow interior in spaced relationship to said wall portion, said first elastic mounting means being bonded to said wall portion; and the other of said dynamic damping systems comprising a second damping mass smaller than said hollow interior and second elastic mounting means for mounting said second damping mass in said hollow interior in spaced relationship to said wall portion, said second elastic mounting means being movable relative to said wall portion.

10. Apparatus for securing vibration sensitive equipment relative to a support, comprising in combination:

a rigid structure having an outer surface for attachment of said vibration sensitive equipment, a hollow interior and a wall portion between said outer surface and said hollow interior;

means attached to said structure for rigidly attaching said structure to said support; and at least two dynamic damping systems in said hollow interior having different resonance characteristics;

one of said dynamic damping systems comprising a first damping mass smaller than said hollow interior and first elastic mounting means for mounting said first damping mass in said hollow interior in spaced relationship to said wall portion, said first elastic mounting means including a first elastic member encompassing at least a portion of said first damping mass and extending from said first damping mass portion to said wall portion; and the other of said dynamic damping systems comprising a second damping mass smaller than said hollow interior and second elastic mounting means for mounting said second damping mass in said hollow interior in spaced relationship to said wall portion, said second elastic mounting means including a second elastic member encompassing at least a portion of said second damping mass and extending from said second damping mass portion to said wall portion.

11. Apparatus as claimed in claim 10, wherein:
said first and second elastic mounting means have different damping characteristics.

12. Apparatus as claimed in claim 10, wherein:
said first and second elastic members have different dimensions.

13. Apparatus as claimed in claim 10, wherein:
said first and second elastic members have different moduli of elasticity.

14. Apparatus as claimed in claim 10, wherein:
at least said first elastic member is bonded to said wall portion.

15. Apparatus as claimed in claim 10, wherein:
at least said first damping mass is bonded to said first elastic member.

16. Apparatus as claimed in claim 10, wherein:
said first elastic member is bonded to said wall portion; and
said second elastic member is movable relative to said wall portion.

17. Apparatus as claimed in claim 10, wherein:
said first and second elastic members are movable relative to said wall portion.

18. Apparatus as claimed in claim 10, wherein:
said first and second elastic mounting means jointly include a third elastic member encompassing a further portion of said first damping mass and a further portion of said second damping mass and extending to said wall portion.

19. Apparatus as claimed in claim 18, wherein:
said third elastic member has a first portion encompassing said further portion of the first damping mass, and a second portion encompassing said further portion of the second damping mass, with said first and second portion of the third elastic member having different dimensions.

20. Apparatus as claimed in claim 18, wherein:
said third elastic member has a first portion encompassing said further portion of the first damping mass, and a second portion encompassing said further portion of the second damping mass, with said first and second portions of the third elastic member having different damping characteristics.

21. Apparatus as claimed in claim 18, wherein:
said third elastic member has a first portion encompassing said further portion of the first damping mass, and a second portion encompassing said further portion of the second damping mass, with said first and second portions of the third elastic member having different moduli of elasticity.

22. Apparatus for securing vibration sensitive equipment relative to a support, comprising in combination:

a rigid structure having an outer surface for attachment of said vibration sensitive equipment, a hollow interior and a wall portion between said outer surface and said hollow interior;

means attached to said structure for rigidly attaching said structure to said support; and at least two dynamic damping systems in said hollow interior having different resonance characteristics;

one of said dynamic damping systems comprising a first damping mass smaller than said hollow interior and first elastic mounting means for mounting said first damping mass in said hollow interior in spaced relationship to said wall portion;

the other of said dynamic damping systems comprising a second damping mass smaller than said hollow interior and second elastic mounting means for mounting said second damping mass in said hollow interior in spaced relationship to said wall portion;

said first damping mass having a first body, a first mounting member projecting from one side of said first body and a second mounting member projecting from an opposite side of said first body;

said second damping mass having a second body, a third mounting member projecting from one side of said second body and a fourth mounting member projecting from an opposite side of said second body;

said first elastic mounting means including a first elastic member encompassing said first mounting member and extending from said first mounting member to said wall portion;

said second elastic mounting means including a second elastic member encompassing said fourth mounting member and extending from said fourth mounting member to said wall portion; and said first and second elastic mounting means including at least one third elastic member encompassing said second and third mounting members and extending to said wall portion.

23. Apparatus as claimed in clam 22, wherein:
said first and fourth mounting members have different dimensions; and
said first and second elastic members have different dimensions accommodating, respectively, the different dimensions of said first and fourth mounting members.

24. Apparatus as claimed in claim 22, wherein:
said second and third mounting members have different dimensions; and
said third elastic member has different apertures accommodating said different dimensions of the second and third mounting members.

25. Apparatus as claimed in claim 22, wherein:
said first and second bodies are of equal mass.

26. Apparatus for securing vibration sensitive equipment relative to a support, comprising in combination:
a rigid structure having an outer surface for attachment of said vibration sensitive equipment, a hollow interior and a wall portion between said outer surface and said hollow interior;
means attached to said structure for rigidly attaching said structure to said support; and
at least two dynamic damping systems in said hollow interior having different resonance characteristics;
one of said dynamic damping systems comprising a first damping mass smaller than said hollow interior and first elastic mounting means for mounting said first damping mass in said hollow interior in spaced relationship to said wall portion; and
the other of said dynamic damping systems comprising a second damping mass smaller than said hollow interior and second elastic mounting means integral with said first elastic mounting means for mounting said second damping mass in said hollow interior in spaced relationship to said wall portion.

27. Apparatus for securing vibration sensitive equipment relative to a support, comprising in combination:
a rigid structure having an outer surface for attachment of said vibration sensitive equipment, a hollow interior and a wall portion between said outer surface and said hollow interior;
means attached to said structure for rigidly attaching said structure to said support; and
a plurality of viscoelastically damped dynamic absorbers having different resonance characteristics;
each of said dynamic absorbers comprising an individual damping mass and individual mounting means for mounting the corresponding damping mass in said hollow interior in spaced relationship to said wall portion; and
each of said mounting means for each of said mounting masses including a viscoelastic damper member encompassing at least a portion of the corresponding damping mass and extending from that damping mass portion to said wall portion of the rigid structure.

28. Apparatus for securing vibration sensitive equipment relative to a support, comprising in combination:
a rigid structure having an outer surface for attachment of said vibration sensitive equipment, a hollow interior and a wall portion between said outer surface and said hollow interior;
means attached to said structure for rigidly attaching said structure to said support; and
at least two dynamic damping systems in said hollow interior having different resonance characteristics;
one of said dynamic damping systems comprising a first damping mass smaller than said hollow interior and first elastic mounting means for mounting said first damping mass in said hollow interior in spaced relationship to said wall portion, said first elastic mounting means including a first viscoelastic damper member encompassing a first end portion of said first damping mass and extending from said first end portion to said wall portion of the rigid structure, and a second viscoelastic damper member encompassing an opposite second end portion of said first damping mass and extending from said second end portion to said wall portion of the rigid structure; and
the other of said dynamic damping systems comprising a second damping mass smaller than said hollow interior and second elastic mounting means for mounting said second damping mass in said hollow interior in spaced relationship to said wall portion, said second elastic mounting means including a third viscoelastic damper member encompassing a first end portion of said second damping mass and extending from said first end portion of said second damping mass to said wall portion of the rigid structure, and a fourth viscoelastic damper member encompassing an opposite second end portion of said second damping mass and extending from said second end portion of said second damping mass to said wall portion of the rigid structure.

29. Apparatus as claimed in claim 28, wherein:
one of said first and second viscoelastic damper members is integral with one of said third and fourth viscoelastic damper members.

30. Apparatus for securing vibration sensitive equipment relative to a support, comprising in combination:
a rigid structure having an outer surface for attachment of said vibration sensitive equipment, a hollow interior and a wall portion between said outer surface and said hollow interior;
means attached to said structure for rigidly attaching said structure to said support; and
at least two dynamic damping systems in said hollow interior having different resonance characteristics;
one of said dynamic damping systems comprising a first damping mass smaller than said hollow interior and first elastic mounting means for mounting said first damping mass in said hollow interior in spaced relationship to said wall portion, said first damping mass having opposite first and second mounting pins, and said first elastic mounting means including a first viscoelastic damper member encompassing said first mounting pin and extending from said first mounting pin to said wall portion of the rigid structure, and a second viscoelastic damper member encompassing said second mounting pin and extending from said second mounting pin to said wall portion of the rigid structure; and
the other of said dynamic damping systems comprising a second damping mass smaller than said hollow interior and second elastic mounting means for mounting said second damping mass in said hollow interior in spaced relationship to said wall portion, said second damping mass having opposite third and fourth mounting pins, and said second elastic mounting means including a third viscoelastic damper member encompassing said third mounting pin and extending from said third mounting pin to said wall portion of the rigid structure, and a fourth viscoelastic damper member encompassing said fourth mounting pin and extending from said fourth mounting pin to said wall portion of the rigid structure, with the thickness of at least one of said third and fourth viscoelastic damper members between said wall portion and the corresponding mounting pin being different from the thickness of at least one of said first and second viscoelastic damper members between said wall portion and the corresponding mounting pin.

31. Apparatus as claimed in claim 30, wherein:
said third mounting pin has a diameter different from the diameter of said second mounting pin and is located adjacent said second mounting pin;
said second viscoelastic damper member is integral with said third viscoelastic damper member; and
said integral second and third viscoelastic damper members have a stepped configuration for accommodating said different diameter second and third mounting pins.

* * * * *